United States Patent [19]

Sorensen

[11] 4,364,289
[45] Dec. 21, 1982

[54] WIRE STRIPPER APPARATUS
[75] Inventor: Ronald J. Sorensen, Richmond, Ind.
[73] Assignee: Belden Corporation, Geneva, Ill.
[21] Appl. No.: 131,919
[22] Filed: Mar. 20, 1980
[51] Int. Cl.³ ............................................. H02G 1/12
[52] U.S. Cl. ................................................... 81/9.51
[58] Field of Search ......................... 81/9.5 R, 9.51
[56] References Cited

U.S. PATENT DOCUMENTS

| | | | |
|---|---|---|---|
| 2,422,776 | 6/1947 | Cunny et al. | 81/9.51 |
| 2,497,112 | 2/1950 | Anden | 81/9.51 |
| 2,765,685 | 10/1956 | Stratman et al. | 81/9.51 |
| 3,154,980 | 11/1964 | Hayden et al. | 81/9.51 |
| 3,176,550 | 4/1965 | Marcotte | 81/9.51 |
| 3,222,956 | 12/1965 | Kramer et al. | 81/9.51 |
| 3,292,462 | 12/1966 | Turecek et al. | 81/9.51 |
| 3,541,896 | 11/1970 | Watson | 81/9.51 |
| 3,638,518 | 2/1972 | Parker | 81/9.51 |
| 3,765,276 | 10/1973 | Pollitt | 81/9.51 |
| 3,786,697 | 1/1974 | Abarotin | 81/9.51 |
| 3,918,330 | 11/1975 | Blaha | 81/9.51 |
| 4,051,749 | 10/1977 | Bell | 81/9.51 |
| 4,074,596 | 2/1978 | Mihulka | 81/9.51 |
| 4,091,695 | 5/1978 | Funcik et al. | 81/9.51 |
| 4,108,028 | 8/1978 | Perrino | 81/9.5 B |
| 4,185,522 | 1/1980 | Reinertz et al. | 81/9.51 |

*Primary Examiner*—James G. Smith
*Attorney, Agent, or Firm*—Fitch, Even, Tabin, Flannery & Welsh

[57] ABSTRACT

A bench model type wire stripper apparatus adapted to partially or completely strip a predetermined length of insulation or jacket layer from a conductor wire or cable, including clamping jaws operable to clamp a wire or cable in relatively fixed position while strip blades or strip and trim blades carried by a carriage are operated to trim the free end of the wire or cable and either partially or fully strip a predetermined length of the insulation or jacket layer from the wire or cable. Various features of the apparatus enable precise and efficient operation with stranded cable of relatively small gauge, such as 28-30 gauge wire, and facilitate stagger stripping of different conductors of the same conductor cord. Interchangeable blade holders enable remote set-up and quick interchange to accommodate various desired strip lengths.

20 Claims, 9 Drawing Figures

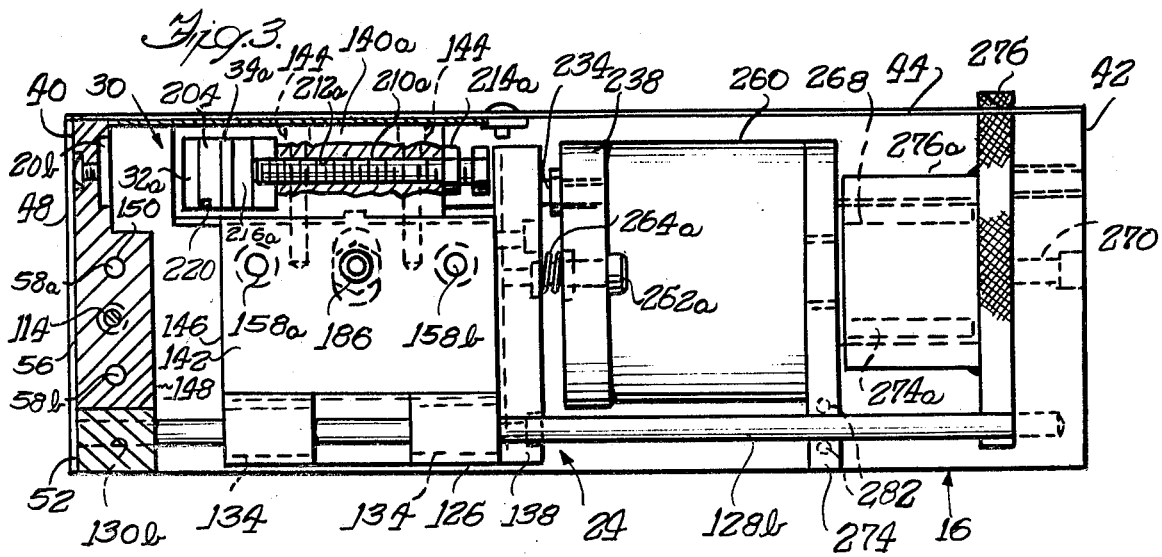
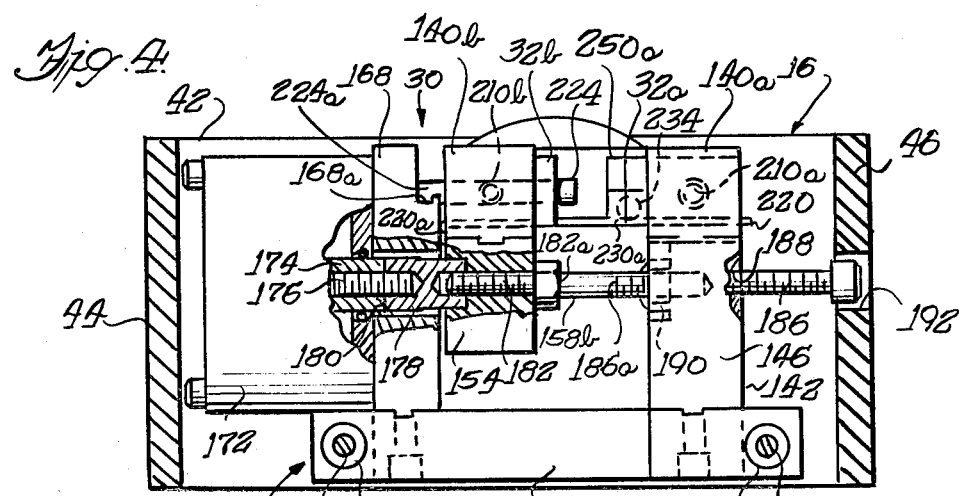
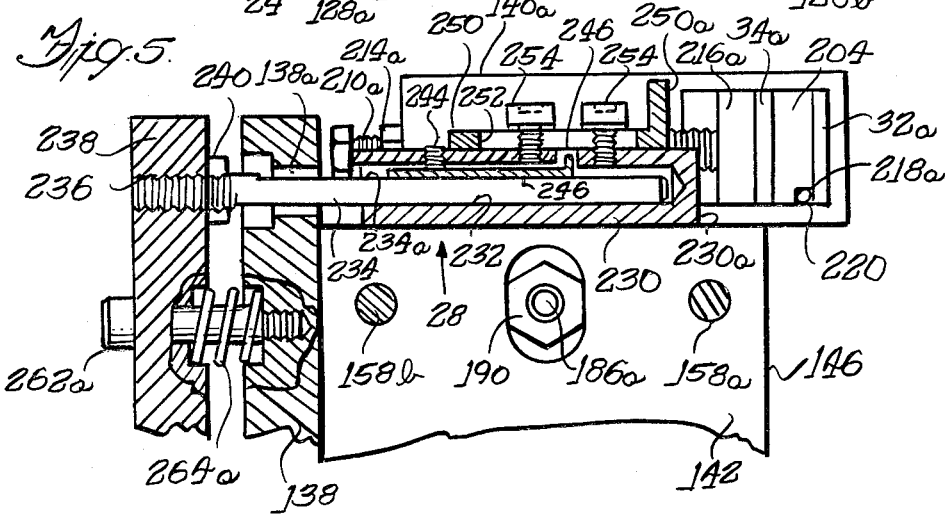

WIRE STRIPPER APPARATUS

The present invention relates generally to apparatus for stripping coaxial jacket or insulation layers from electrical wires and cables and the like, and more particularly to a novel wire stripping apparatus which facilitates highly efficient and precise stripping of electrical conductor wires and stranded cable of relatively small gauge size.

Apparatus for stripping insulation or jacket layers from electrical conductors by clamping the insulated wire or cord, severing the insulation or jacket layer and thereafter stripping a length of the severed insulation or jacket layer from an underlying longitudinal electrical conductor wire are generally known. For the most part, such wire strippers include means for clamping the wire preparatory to stripping the insulation of jacket layer therefrom, stripper blades moveable to sever the insulation or jacket layer, and means for moving the stripping blades longitudinally along the wire so as to remove the severed insulation or jacket layer therefrom.

The known apparatus or devices for stripping insulation or jacket layers from electrical conductors, while being generally acceptable for their intended purposes, exhibit significant drawbacks in respect to the very precise requirements needed for stripping small gauge wire, such as 28 to 30 gauge conductor wire. In stripping such small gauge single or stranded wire, it is particularly critical that the stripper blade penetrate only the insulation or jacket layer without contacting the underlying metallic conductor so as not to nick and thereby adversely affect the characteristics of the conductor.

Another important feature of any wire stripper is that it be capable of preparing successive ones of a selected group of conductors for exposure of an identical predetermined length of conductor, either by fully stripping a length of insulation layer or by partially removing the insulation layer to enable full removal at a later time. In either event, precise conductor length exposure is necessary to enable use of the conductors with automatic and semi-automatic circuit soldering apparatus. It is highly desirable that preciseness be achieved without compromising the efficiency or production capabilities of the stripping apparatus. Accordingly, the need for wire stripping apparatus capable of stripping wire or cable, and particularly conductor wire or cable of relatively small gauge, in a highly efficient and economical manner is readily apparent.

A general object of the present invention is to provide a precision wire stripper for fully or partially stripping an insulation or jacket layer from a longitudinal conductor wire or cable, and which apparatus is relatively economical to manufacture and highly efficient in operation.

A more particular object of the present invention is to provide a wire stripper apparatus which finds particular application in stripping insulation or jacket layers from relatively small gauge stranded conductor wire, and which apparatus includes a novel arrangement of elements facilitating precise and quick operator adjustment.

Another object of the present invention is to provide novel apparatus for stripping insulation and jacket layers from single or stranded conductor wires, which apparatus includes stripper blades or stripper and trim blades mounted on a carriage and operable to strip or substantially simultaneously trim and strip a selected length of insulation or jacket layer, and has actuator and stop means operatively associated with the carriage and operative to cause release of severed slugs of insulation or jacket material after each successive stripping operation so as to prevent clogging or jamming of the apparatus.

Yet another object of the present invention is to provide apparatus for stripping insulation and jacket layers from lengths of conductive wire or stranded conductor cable, which apparatus includes a novel adjustable stop enabling staggered stripping of different conductors of the same conductor cord without interrupting operation for adjustments to the apparatus.

A feature of the wire stripping apparatus in accordance with the invention lies in the provision of a novel wire support and slug knockout arrangement cooperative with the stripping and trim blades to insure proper positioning of a conductor wire or cable to be stripped, and for insuring release of insulation or jacket layer slugs from the strip and trim blades.

Another feature of the invention lies in the provision of ball bushings and associated lip seals in conjunction with various moving components of the apparatus so as to reduce wear and insure precision alignment during successive stripping operations.

Still another feature of the wire stripping apparatus in accordance with the invention lies in the provision of interchangeable blade holders which facilitate set-up at a remote location and quick and accurate interchanging to accomodate different desired strip lengths.

Further objects, features and advantages of the present invention, together with the organization and manner of operation thereof, will become apparent from the following detailed description of the invention when taken in conjunction with the accompanying drawings wherein like reference numerals designate like elements throughout the several views, and wherein:

FIG. 3 is a vertical sectional view taken substantially along line 3—3 of FIG. 1, looking in the direction of the arrows, but with the carriage in its rearward position and with portions broken away for purposes of clarity;

FIG. 4 is a transverse sectional view taken substantially along line 4—4 of FIG. 1, looking in the direction of the arrows, with portions broken away for clarity;

FIG. 5 is a fragmentary sectional view, on an enlarged scale, taken substantially along line 5—5 of FIG. 1 and looking in the direction of the arrows;

Figure 1:
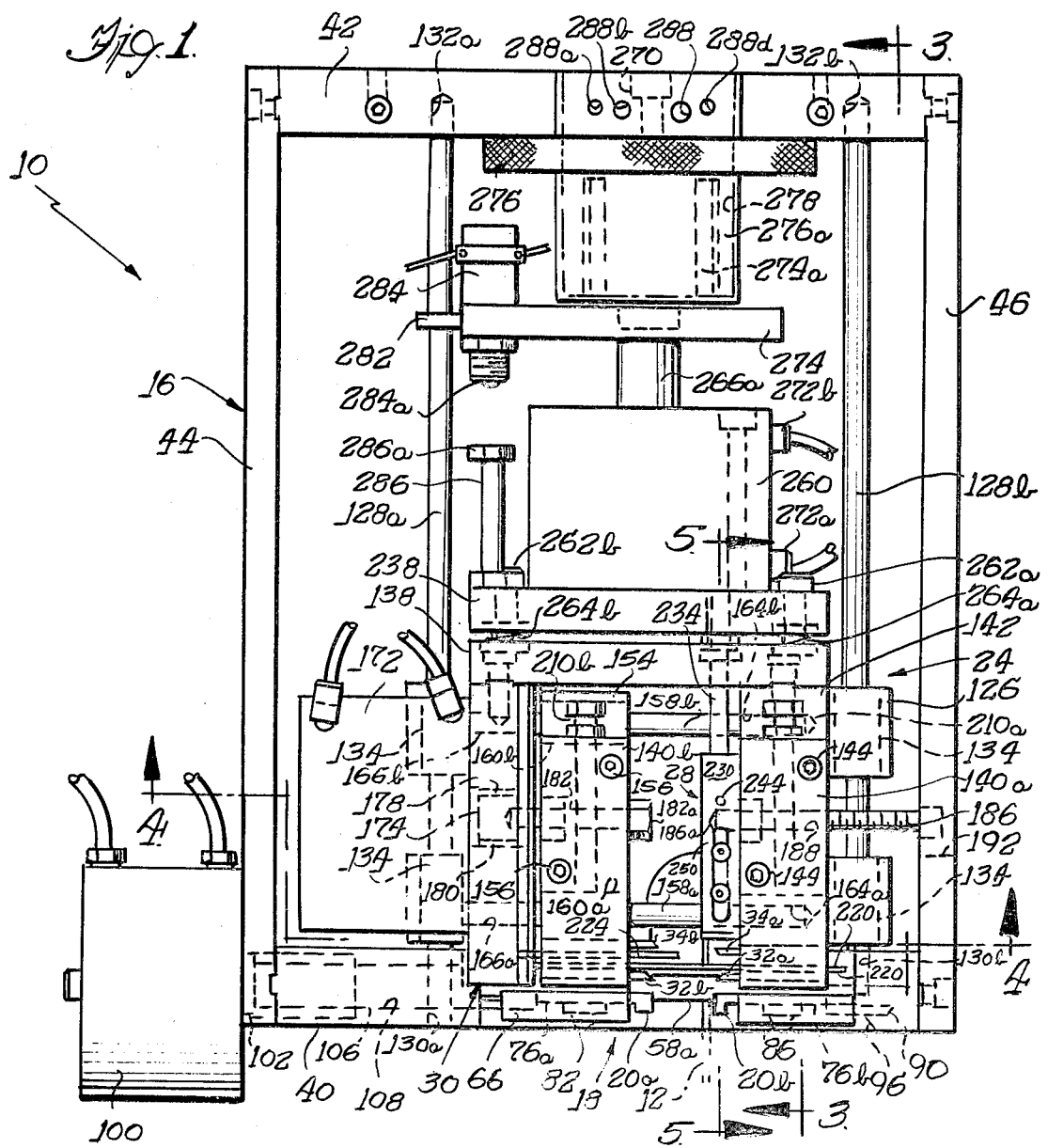
FIG. 1 is a plan view of a wire stripping apparatus constructed in accordance with the present invention, an outer cover plate and various pneumatic control circuit components being removed for clarity.

Referring now to the drawings, and in particular to FIGS. 1-4, a wire stripper apparatus constructed in accordance with the present invention is indicated generally at 10. The wire stripper apparatus 10, which may hereinafter be referred to as a wire stripper, comprises a bench model type wire stripper adapted to either partially or completely strip a predetermined length of an insulation or jacket layer from an electrical wire or conductor cable, a length of which is indicated in phantom at 12 in FIG. 1. As used herein, the term electrical conductor wire encompasses a conventional single or multiple strand metallic conductor element having an insulation layer, generally of rubber of a suitable flexible dielectric plastic material, formed coaxially along its length. The term conductor cable or cord encompasses the type of electrical conductor having a plurality of individually insulated conductors either braided or in parallel relation internally of a coaxial jacket layer. As will become more apparent hereinbelow, the wire stripper 10 is adapted to strip a predetermined length of insulation layer from a single insulated conductor wire, or strip a predetermined length of jacket material from a length of conductor cable or cord whereafter one or more internal "singles" may have a predetermined length of its insulation layer stripped therefrom or severed and partially removed to facilitate removal by an operator during a subsequent operation.

A particular feature of the wire stripper 10 is its adaptability for staggered cutting, slitting or other secondary conductor end finishing operations, as well as being adapted to simultaneously trim and strip insulation and jacket layers from electrical conductor wires and cables. The wire stripper 10 is particularly adapted for precision stripping of small size conductor wires such as 28 to 30 gauge which, in stranded wire form, may include approximately 7 strands of 36 to 38 gauge conductor wire.

Very generally, the wire stripper apparatus 10 includes base means, indicated generally at 16, on which is mounted clamping means, indicated generally at 18, which includes a pair of clamping jaws 20a and 20b supported for relative movement between open positions defining an entry opening to enable insertion of a conductor wire or cable 12 to be stripped, and closed positions clamping the length of conductor wire in substantially fixed longitudinal relation relative to the wire stripper.

Carriage means, indicated generally at 24, are mounted on the base 16 for movement longitudinally of the apparatus, and carry stop means 28 against which the forward end of a conductor wire or cable is referenced preparatory to stripping and trimming. The carriage means 24 also supports stripper means 30 thereon which, in the illustrated embodiment, may be adapted to partially or fully strip a predetermined length of insulation or jacket layers or to substantially simultaneously trim and either partially or fully strip a predetermined length of insulation or jacket layer from the associated conductor wire or cable.

In stripping relatively small gauge conductor wire, the insulation layer may have an outer diameter of approximately 1/32 inch and is trimmed and stripped to form a "slug" of insulation layer having a length of approximately ⅛ inch. As will become more apparent hereinbelow, the stripper apparatus 10 is adapted to prevent clogging of the apparatus by such insulation slugs when stripped from associated conductor wires.

Figure 6:
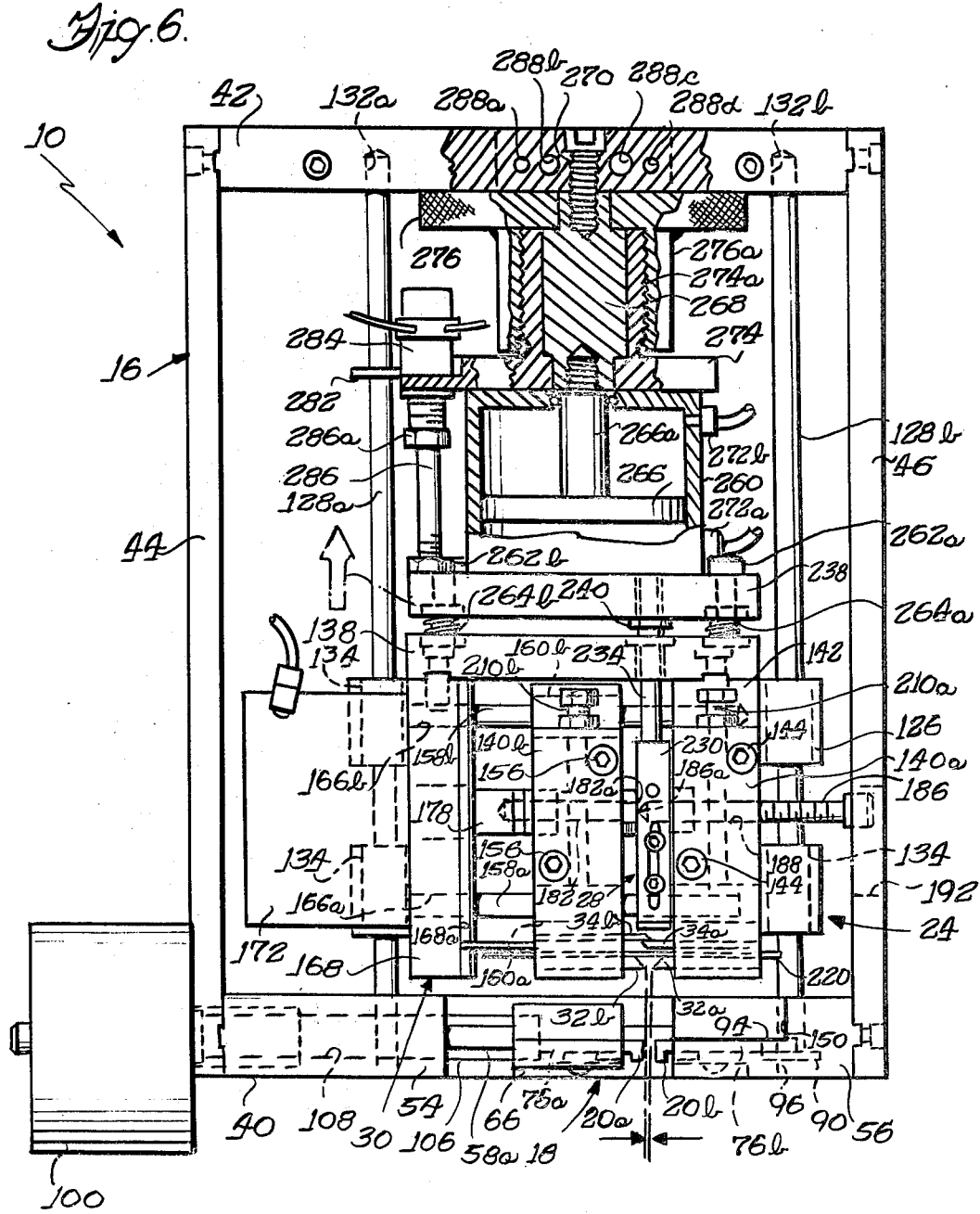
FIG. 6 is a plan view similar to FIG. 1 but with portions broken away and with the carriage and associated stripping and trim blades in their rearward positions.

Very generally, when it is desired to strip the insulation or jacket layer from a length of conductor wire or cable, such as indicated at 12, an end portion of the conductor wire is inserted into the wire stripper 10 between the clamping jaws 20a,b so that the forward end of the conductor wire engages a reference surface on the stop means 28. The operator then depresses a foot pedal valve, to be described in conjunction with the pneumatic control circuit of FIG. 9, which effects movement of the clamping jaw 20a to clamp the conductor wire between the clamping jaws. In the illustrated embodiment, substantially simultaneously with closing of the clamping jaws 20a,b mutually cooperating pairs of stripping and trim blades 32a, 32b and 34a, 34b, respectively, which form part of the stripper means 30, are moved from relatively open positions, as illustrated in FIG. 1, to relatively closed positions, as illustrated in FIG. 6, such that the cooperating trim blades 34a,b completely sever both the insulation layer and the underlying longitudinal conductor element while the stripping blades 32a,b cooperate to cut through or slit only the insulation layer on diametrically opposite sides thereof.

After the stripping blades 32a,b and trim blades 34a,b have reached their maximum closed positions, the carriage 24 is caused to move longitudinally rearwardly of the base 16 during which the closed stripping blades 32a,b cause the insulation layer disposed between the stripping and trim blades to be severed from the remaining insulation layer and, depending upon the predetermined setting of the stroke or travel of carriage 24, either fully removed as a severed insulation layer "slug" or partially removed from the underlying conductor element.

Turning now to a more detailed description of the wire stripper apparatus 10, the base 16 comprises a generally rectangular framework having parallel upstanding front and rear end walls 40 and 42, respectively, which extend transversely of the wire stripper and are connected at their lateral edges to longitudinally extending planar sidewalls 44 and 46 preferably in tongue and groove relation so as to provide a rigid rectangular framework open at its top and bottom. A removeable cover plate, indicated in phantom at 48 in FIGS. 1 and 2, having a generally inverted L-shaped side profile is adapted to be releasibly attached to the base 16 so as to overlie the upper and forward ends thereof except for access openings as will be described hereinbelow. In this manner, the bottom of the wire stripper 10 is open enabling mounting of the stripper on a bench in overlying relation to an opening through which slugs of stripper insulation or jacket material may pass to a suitable waste receptacle.

Figure 2:
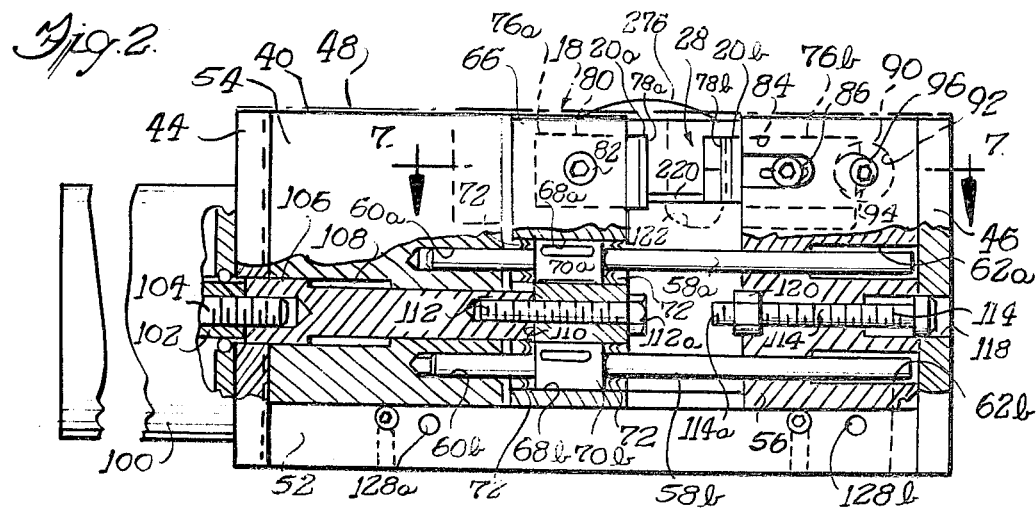
FIG. 2 is a front elevational view of the wire stripper apparatus of FIG. 1, portions being broken away to better illustrate various components of the apparatus.

With particular reference to FIG. 2, the front end wall 40 includes a transverse base 52 on which laterally spaced upstanding base blocks 54 and 56 are mounted. The upstanding base blocks 54 and 56 cooperate to support a pair of parallel bearing or guide rods 58a and 58b therebetween so that the axes of the bearing rods lie in a plane transverse to the longitudinal axis of the base 16. The left-hand ends of bearing rods 58a,b are received in blind bores 60a and 60b, respectively, formed in base block 54 while the right-hand ends of the bearing rods are received within stepped bores 62a and 62b formed in the base block 56 so as to enable assembly and disassembly of the bearing rods through bores 62a,b when the sidewall 46 is removed.

The guide rods 58a and 58b serve to support a clamp holder block 66 in guided relation thereon to facilitate precise movement of the clamp holder block relative to the base block 54. To this end, the clamp holder block 66 has a pair of parallel coplanar cylindrical bores 68a and 68b formed therethrough which snugly receive ball bushings 70a and 70b of conventional design. The ball bushings 70a and 70b have precise low friction sliding engagement on the bearing rods 58a,b and thereby facilitate precise guided movement of the clamp holder block 66. Identical lip seals 72 of known design are assembled within the bores 68a,b on opposite ends of the ball bushings 70a,b to prevent contamination of the ball bushings.

Figure 7:
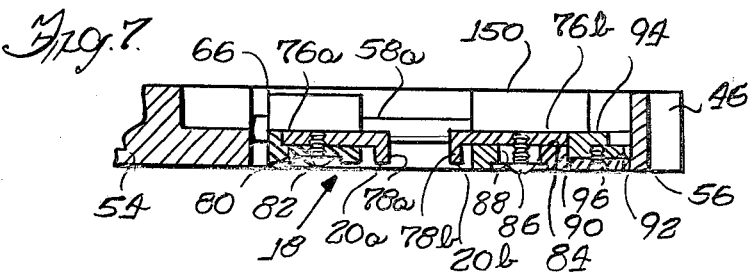
FIG. 7 is a fragmentary sectional view taken substantially along line 7—7 of FIG. 2, looking in the direction of the arrows.

The base block 56 and movable clamp holder block 66 support the clamping jaws 20a and 20b for relative movement between their aforementioned open and closed positions. With particular reference to FIG. 7 taken in conjunction with FIGS. 1 and 2, the clamping jaws 20a and 20b may be identical in configuration and, in the illustrated embodiment, each includes a generally L-shaped body 76a and 76b, respectively, which cooperate to define mutually opposed clamping surfaces 78a and 78b. Clamping jaw 20a is mounted within a rectangularly shaped recess 80 formed in the upper portion of the clamp holder block 66 and is retained in fixed relation therein by a cap screw 82 such that the clamping surface 78a lies in a plane transverse to the axes of bearing rods 58a,b.

Clamping jaw 20b is mounted within a recess 84 formed in the base block 56 so as to be laterally aligned with the clamping jaw 20a. The clamping jaw 20b is retained within recess 84 by a screw 86 received through an elongated slot 88 in the base block 56 so as to enable lateral adjustment of the clamping jaw 20b relative to base block 56. A cam member 90 is mounted within a circular recess 92 in the base block 56 and has a cylindrical boss 94 formed eccentrically thereon so that the outer peripheral surface of the boss defines a cam stop surface for abutment with the right-hand edge of the clamping jaw 20b, as illustrated in FIG. 7. The cam member 90 is retained within recess 92 by a suitable screw 96 which, when loosened with screw 86, enables adjustment of the cam member to selectively vary the position of clamping jaw 20b while providing a positive stop therefor.

Movement of the clamp holder block 66 and associated clamping jaw 20a relative to the fixedly supported clamping jaw 20b is effected by actuating means in the form of a double acting pneumatic cylinder 100 which is mounted on the sidewall 44 and has its actuating piston rod 102 axially connected through a threaded connector 104 to a stepped cylindrical spacer stud 106 slidable within a suitable opening in the sidewall 44 and a stepped bore 108 formed in the base block 54 so that the axis of stud 106 is coplanar with the axes of bearing rods 58a,b. The outer end of spacer stud 106 is received within a counterbore 110 in clamp holder block 66 and is fixed therein by a screw 112 having a head 112a. The outer end surface of screw head 112a is formed flat and acts as a reference stop surface for abutment with an inner end 114a of a socket head cap screw 114 having threaded engagement with a threaded bore 116 formed in the base block 56 in axial alignment with screw 112. The head 112a of screw 112 and end surface 114a of screw 114 define adjustable positive stop means for limiting movement of clamping jaw 20a relative to clamping jaw 20b, the screw 114 enabling the operator to readily adjust the closed relation of the clamping jaws through a suitable opening 118 in the sidewall 46 of the base. An elastic stop nut 120 of conventional design is retained captive in a recessed slot in base block 56 and engages screw 114 to maintain the screw 114 in fixed adjusted position.

As illustrated in FIG. 2, the cover plate 48 is provided with an access opening 122 positioned to enable insertion of a conductor wire 12 between the clamping jaws 20a,b, the access opening also extending into the upper surface of the cover plate to enable the conductor wire to be inserted by moving it downwardly as well as forwardly relative to the clamping jaws.

As aforementioned, when stripping and trimming a conductor wire, such as 12, with the wire stripper apparatus 10, the operator places the conductor wire between the clamping jaws 20a,b such that the forward end of the conductor wire engages the stop means 28. With particular reference to FIGS. 1, 3, 4 and 8, the stripper means 30 is mounted on the carriage means 24 to enable longitudinal movement of the strip and trim blades 32a,b and 34a,b, respectively, longitudinally of the wire stripper so as to fully or partially strip the severed insulation layer from the underlying conductor. The carriage means 24 includes a carriage base 126 which is mounted on a pair of parallel coplanar bearing or guide rods 128a and 128b the forward ends of which are received through bores 130a and 130b formed in the front end wall 40, and the rearward ends of which are received and supported within blind bores 132a and 132b formed in the rear end wall 42. In this manner, the bearing rods 128a,b may be readily mounted on the front and rear end walls 40 and 42 by inserting them through the forward bores 130a,b.

The carriage base 126 is mounted on the bearing rods 128a,b through four identical ball bushings 134 which are identical to the aforedescribed ball bushings 70a,b and which provide precision low friction sliding movement of the carriage base 126 along the guide rods. Annular lip seals similar to the aforedescribed lip seals 72 are mounted adjacent the opposite ends of each ball bushing 134 to prevent contamination thereof. The carriage means 24 includes a carriage back plate 138 affixed in upstanding relation to the rearward edge of the carriage base 126. The carriage base 126 and back plate 138 cooperate to support the stripper means 30 for selective movement along the bearing rods 128a,b.

In the illustrated embodiment, the stripper means 30 includes the aforementioned pairs of stripping blades 32a,b and trim blades 34a,b which are mounted on identical blade holders 140a and 140b for relative movement therebetween in planes transverse to the longitudinal axis of the wire stripper 10, the strip and trim blades being substantially longitudinally aligned with the clamping jaws 20a,b as when viewed in FIGS. 2 and 4. The blade holder 140a is mounted on a first blade holder support block 142 through a pair of cap screws 144 and preferably has tongue and groove relation with the upper surface of the support block 142. The support block 142 is mounted in upstanding relation on the carriage base plate 126 and back plate 138 and preferably also has tongue and groove relation therewith. The support block 142 has a forward end surface 146 which is coplanar with the forward edge of the carriage plate 126 and serves to abut a rearward planar surface 148 on the front end wall 40 of the base when the carriage means 24 and stripper means 30 are in their forward positions preparatory to a stripping operation, as illustrated in FIG. 1. As shown in FIG. 3, the blade holder 140a projects forwardly of its associated support block 142 so as to be received within a recess 150 formed in the upper end of the base block 56 when the stripper means is in its forward position. In this position the strip blade 32a is closely adjacent the clamping jaw 20a.

The blade holder 140b is mounted on a second blade holder block 154 through cap screws 156 and has tongue and groove relation therewith similar to mounting of the blade holder 140a on support block 142. The blade holder block 154 is mounted on a pair of parallel coplanar bearing rods 158a and 158b through ball bushings 160a and 160b which are received and retained within suitable cylindrical bores in the blade holder block 154 and have precise low friction sliding relation on the bearing rods 158a,b, respectively. The ball bushings 160a,b are substantially identical to the aforementioned ball bushings 70a,b and have annular lip seals associated with the opposite ends thereof to prevent contamination.

The bearing rods 158a and 158b have their right-hand ends received within blind bores 164a and 164b, respectively, formed in the blade holder support block 142. The left-hand ends of the bearing rods 158a,b are supported within bores 166a and 166b, repectively, formed through a support block 168 fixedly mounted in upstanding relation on the carriage plate 126 and carriage back plate 138 and preferably having tongue and groove relation therewith.

The support block 168 supports actuator means for the stripping means 30 in the form of a pneumatic double acting cylinder 172, termed the blade actuating cylinder, having an actuating piston rod 174 connected through a threaded connector 176 to a spacer stud 178 which is received through a suitable bore 180 in the support block 168. The spacer stud 178 has its outer end received within a counterbore in the blade holder block 154 and is secured therein by a screw 182 having a head on which is formed on a planar stop surface 182a. Actuation of the cylinder 172 is operative to effect movement of the blade holder block 154 and associated blade holder 140b relative to the fixed blade holder 140a as will be described more fully hereinbelow.

A hex head screw 186 has threaded connection with a threaded bore 188 through the blade holder support block 142 and is axially aligned with the axis of the actuating piston rod 174. The screw 186 defines a stop surface 186a on its inner end which is adjustable for cooperation with the stop surface 182a on screw 182 to selectively limit the extent of travel of the blade holder 140b toward the blade holder 140a. An elastic stop nut 190 similar to nut 120 is retained captive in a recessed slot in blade holder support block 142 and engages screw 186 to facilitate locking of the screw 186 in fixed relation after establishing the desired limit of travel for blade holder 140b.

An elongated opening 192 formed in the base side wall 46 to enable operator adjustment of the screw 186, the opening 192 being of sufficient length to allow unrestricted travel of the carriage means 24 and screw 186 during a stripping operation.

Figure 8:
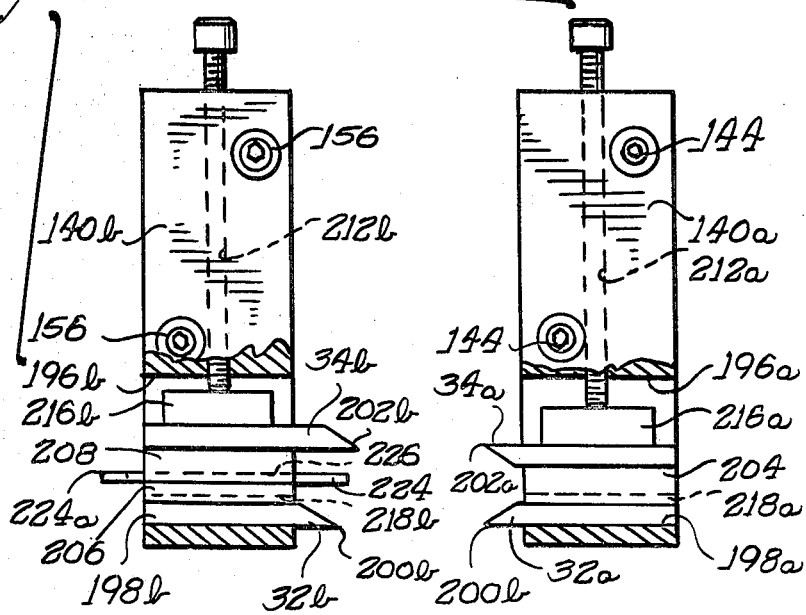
FIG. 8 is a fragmentary plan view of an arrangement for mounting the strip and trim blades on associated interchangeable blade holders.

Referring now to FIGS. 3 and 8, taken in conjunction with FIG. 1, each of the blade holders 140a and 140b comprises a substantially rectangular block having a lateral width equal to the width of its underlying support block 142 and 154, respectively. The blade holders 140a, 140b have rectangular openings 196a and 196b, respectively, formed therethrough which define corresponding forward planar reference surfaces 198a and 198b disposed transverse to the axis of the base 16 and against which the corresponding stripper blades 132a and 132b are positioned. The stripping blades 32a,b and trim blades 34a,b are preferably rectangular and are generally planar, having a vertical height, as considered in FIG. 4, approximately equal to the vertical height of the clamping jaws 20a,b. The strip blades 32a,b have relatively sharp mutually opposed cutting edges 200a and 200b (FIG. 8) which lie in the surfaces thereof engaged against the reference surfaces 198a,b of the blade holders 140a,b. The trim blades 34a,b are of generally similar configuration but are mounted in opposed relation such that a cutting edge 202a on trim blade 34a and a cutting edge 202b on trim blade 34b may pass each other in close proximity to enable full severing of the longitudinal conductor element of a conductor wire being trimmed and stripped.

In the illustrated embodiment, the length of insulation stripped from a conductor wire, such as 12, is established by selective spacing of the trim blades 34a,b rearwardly from the strip blades 32a,b. Such spacing of the strip and trim blades may be effected by rectangular spacer blocks positioned between the respective strip and trim blades 32a, 34a and 32b, 34b, as indicated at 204, 206 and 208 in FIG. 8. The assembled strip and trim blades 32a,b and 34a,b and the associated spacer blocks are maintained in assembled relation against the reference surfaces 198a,b by corresponding allen head screws 210a and 210b having threaded connection with centered threaded bores 212a and 212b formed longitudinally of the respective blade holders. Spacer blocks 216a and 216b are disposed between the inward ends of the screws 210a,b and the associated trim blades 34a,b to prevent marring of the trim blades by the mounting screws. It will be appreciated that if desired, the trim blades 34a,b need not be employed, in which case the length of insulation or jacket layer stripped will be equal to the distance between the stripping blades 32a,b and a reference surface on the stop means 28 against which the end of the conductor wire is referenced.

As best illustrated in FIGS. 4, 5 and 8, two of the laterally opposite blade spacer blocks, such as 204 and 206, are provided with corner recesses 218a and 218b, respectively, which are of sufficient size to receive a relatively stiff wire 220 therethrough. The wire 220 has an L-shaped end 220a (FIG. 4) which hooks about the edge of the blade holder 140b facing the mounting block 168. The wire 220 extends between the blade holders 140a,b during their full operating movement and is supported at an elevation substantially equal to the lower edge of the blades 32a,b and 34a,b so as to prevent downward movement of a wire inserted within the apparatus 10 to a position lower than the clamping jaws and blades, thus preventing an operator from placing the conductor wire to be stripped at a position where it might not be engaged by the cutting edges of the blades.

During trimming and stripping of a length of insulation or jacket layer from a conductor wire or cable, the severed "slug" of insulation jacket material may remain lodged between the strip blade 32b and associated trim blade 34b as the blade holder 140b is returned to its open position spaced from blade holder 140a. To eject any such slug lodged between the blades 32b, 34b, a knockout member 224 is mounted on the support block 168 in operative association with the blade holder 140b and is positioned to eject any such slug retained between the blades 32b and 34b when they are returned to their open positions. As illustrated in FIGS. 1, 4 and 8, the knock-out member 224 may comprise a relatively flat member having a hook-like end 224a adapted for receipt within a recess or channel 168a formed in the support block 168 so as to prevent longitudinal movement of the knock-out member and thus maintain it in relatively fixed relation to the block 168. The knock-out member 224 is received through a rectangular channel 226 formed in spacer block 208 and has sufficient length to project laterally forwardly from the cutting edges of the blades 32b, 34b when in their open positions but is made short enough so as to not inhibit placement of a conductor wire or cable in position to be stripped and trimmed.

As aforementioned, in placing a conductor wire or cable within the stripper apparatus 10 preparatory to stripping a length of the insulation or jacket layer therefrom, the operator positions the conductor wire so that its forward end references against the stop means 28. With particular reference to FIG. 5, taken in conjunction with FIGS. 1 and 6, the stop means 28 includes a generally rectangularly shaped stop member 230 having a planar end surface 230a which defines a first reference stop surface for the stop means 28. The stop member 230 has an axial bore 232 formed therein which enables mounting of the stop member on a support rod 234 which passes through a bore 138a in the carriage backing plate 138 and has fixed threaded connection with a threaded bore 236 formed in a mounting plate 238 to be described hereinbelow. A lock nut 240 is preferably mounted on the rod 234 to maintain it in fixed relation on the mounting plate 238.

The stop member 230 is adjustable along the length of support rod 234 to facilitate selective positioning of the stop surface 230a relative to the strip and trim blades 32a,b and 34a,b. To this end, the stop member 230 has a set screw 244 mounted within a suitable threaded bore formed radial to the axis of the bore 232. To prevent marring of the support rod 234 by the screw 244 as would inhibit fine adjustment of the stop member 230 on the rod 234, a generally L-shaped bronze bearing member 246 is interposed between the set screw 244 and a flat surface 234a formed along the length of the support rod 234 and oriented to face upwardly. A tab or leg 246a of the bearing member 246 extends upwardly within a bore 230b in the stop member 230 to fix the bearing member longitudinally relative to the stop member. In this manner, the set screw 244 bears against the upper surface of the bearing member 246 when tightened downwardly to fix the position of the stop member 230 on the support rod 234 and does not mar the support rod, thus enabling finite adjustment of the stop member on the support rod.

An L-shaped stop member 250 is adjustably mounted on the upper surface of the stop member 230 and has a forwardly facing planar surface 250a which defines a second reference stop surface for the stop means 28. The stop member 250 has an elongated slot 252 formed longitudinally thereof which receives a pair of cap head screws 254 having threaded engagement with suitable threaded bores in the stop member 230. Loosening of screws 254 enables selective positioning of the stop surface 250a relative to stop surface 230a. In the illustrated embodiment, the stop surfaces 230a and 250a are of generally equal area and the support rod 234 is supported on the mounting plate 238 such that the upper surface of stop member 230 lies in a plane which is normal to and intersects the blades 32a and 34a approximately midway of their vertical heights. An operator stripping a multiple wire cable may thus selectively position the stop surfaces 230a and 250a so that, if the trim blades 34a,b are not employed, the stop surfaces 230a and 250a enable different lengths of insulation layer to be stripped from different conductor wires of the same conductor cable during successive stripping cycles. When employing both strip and trim blades, as in the illustrated embodiment, the operator may position a first conductor wire of the cable against the stop surface 230a for trimming a first predetermined length of insulation layer from the conductor wire, while a second different conductor wire of the cable may be referenced against the stop surface 250a so as to trim a second and different (i.e. greater) predetermined length of insulation layer from the corresponding conductor wire.

In stripping a length of insulation or jacket layer from a conductor wire clamped between the clamping jaws 20a,b, the carriage means 24 is moved from its forward position, as illustrated in FIG. 1, longitudinally rearwardly along the path of bearing rods 128a,b to its rearward position as shown in FIG. 6 while the stripper blades 32a,b are in their relative closed positions. To effect such longitudinal movement of the carriage means 24 and associated stripper means 30, actuator means in the form of a double acting pneumatic cylinder 260, termed the strip actuating cylinder, is operatively connected to the carriage means 24 and the rear base end wall 42 and is selectively operable to move the carriage means and associated stripper means between forward and predetermined rearward positions. The strip actuating cylinder 260 is fixedly mounted on the aforenoted mounting plate 238 which, in turn, is mounted on the carriage back plate 238 through a pair of laterally spaced cap screws 262a and 262b which having sliding relation within suitable bores in mounting plate 238 and are threadably fixed at their forward ends to the carriage back plate 138 as illustrated in FIGS. 5 and 6. A pair of identical coil compression springs 264a and 264b are mounted coaxially of the screws 262a and 262b, respectively, and are interposed between the carriage plate 138 and mounting plate 238 so as to urge the plates 138 and 238 to spaced apart relation as limited by the heads of the cap screws 262a,b.

The strip actuating cylinder 260 has an actuating piston 266 having a piston rod 266a, the outer end of which has threaded engagement with a generally cylindrical spacer stud or connector which is fixed to the rear base wall 42 by a screw 270, as illustrated in FIG. 6. In this manner, the piston 266 is fixed to the base end wall 42 such that introducing sufficient air pressure on the piston end of the actuating cylinder, as through a suitable fitting 272a, operates to move the carriage means 24 to its forward position wherein the blade holder support block 142 engages the rearward surface 148 on the forward base wall 40. Conversely, relieving the fluid pressure on the piston end of the cylinder 260 and introducing a suitable fluid pressure on the rod end of the actuating cylinder, as through a fitting 272b, operates to pull the carriage means 24 toward the rear end wall 42 until the end surface 260a of the actuating cylinder 260 engages a stop plate 274 which defines the rearward limit of travel of the carriage means 24 and associated stripper means 30.

To facilitate selective adjustment of the stroke of the carriage means 24 and associated stripper means 30, the stop plate 274 has an externally threaded annular boss 274a affixed thereto or formed integral therewith, which boss has threaded connection with an internally threaded annular boss 276a mounted coaxially on an externally knurled circular adjusting plate 276. The adjusting plate 276 is supported on and rotatable about the axis of the spacer stud 268 which, as aforementioned, is affixed to the rear base wall 42. The adjusting plate 276 is of a diameter sufficient to have its outer surface projecting upwardly through a rectangular opening 278 in the cover plate 48 thereby providing access by the operator for selectively rotating the plate 276 to vary the position of the stop plate 274 and thus adjust the rearward limit of travel of the cylinder 260 and associated carriage means 24.

The stop plate 274 may be generally rectangular in elevational profile and has a pair of parallel outwardly projecting dowel rods, one of which is indicated at 282, which capture the bearing rod 128a therebetween and prevent rotation of the stop plate 274 about the axis of the spacer stud 268. The stop plate 274 also supports a spool-type control valve 284 of conventional design having its valve spool controlled by the head 286a of an actuator rod 286 which may comprise a screw adjustably mounted in normal relation to the cylinder mounting plate 238 in axial alignment with the valve 284. The operation and function of valve 284 will become apparent in the following description of the control circuit of FIG. 9.

As aforementioned, a feature of the wire stripper apparatus 10 is that it enables the operator to readily make adjustments to the apparatus, for example, in adjusting the closed relation of clamping jaws 20a,b and the closed relation of blades 32a,b and 34a,b, without need for a special mechanic or set-up operator. Such adjustment may be readily accomplished with conventional allen type wrenches for use with the adjustable stop screws 114 and 186, and for use with the allen screws 144, 156 and 254, as well as the set screw 244. A feature of the present invention lies in the provision of tool holder means in the form of a plurality of blind bores, indicated at 288a,b,c and d in FIG. 1, which receive various size allen wrenches therein for use in making the various adjustments as may be needed during operation of the stripper apparatus.

Figure 9:
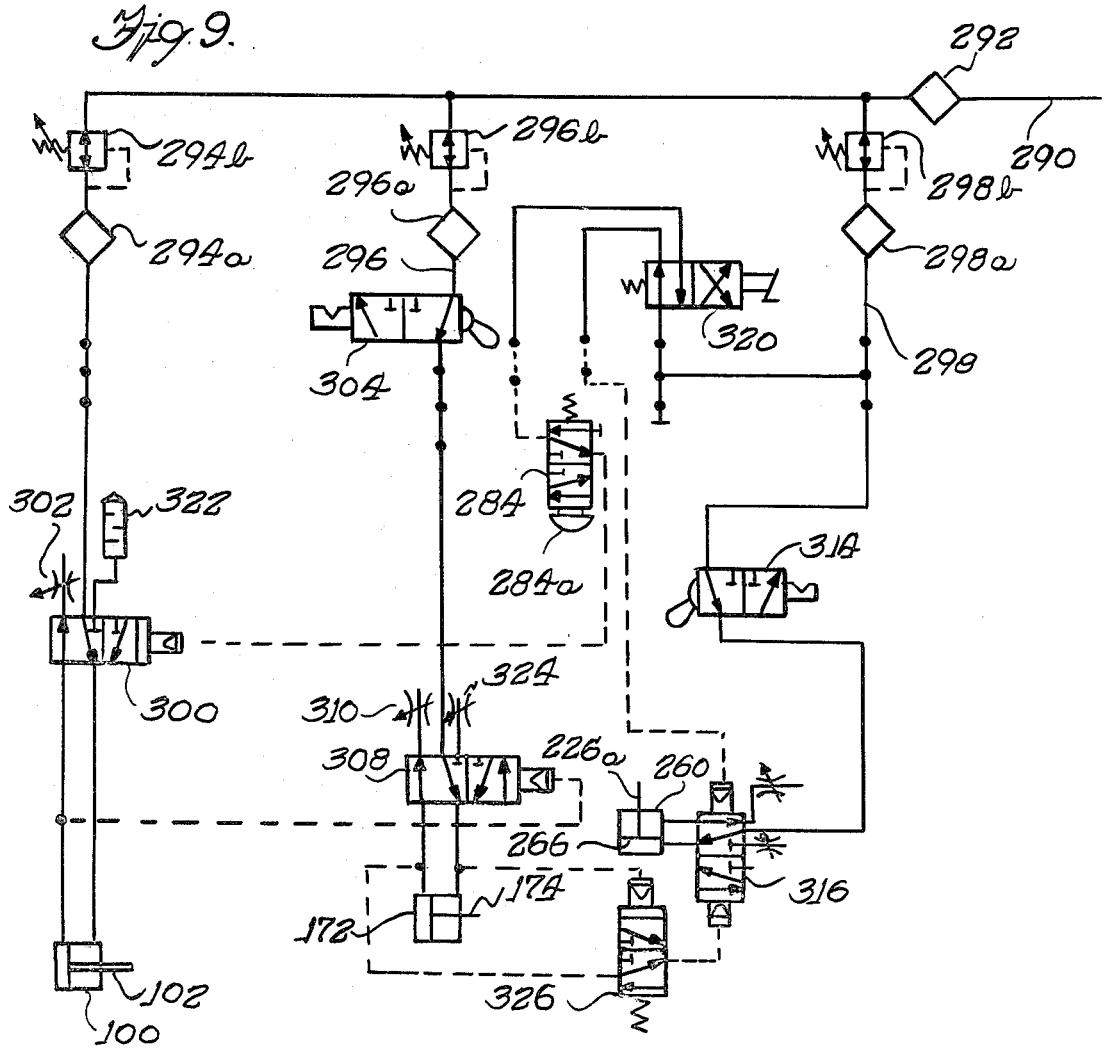
FIG. 9 is a schematic circuit diagram of a pneumatic control circuit for effecting operation of the apparatus of FIGS. 1 and 6.

FIG. 9 schematically illustrates a control circuit for effecting semi-automatic operation of the wire stripper 10 in accordance with the illustrated embodiment. The pneumatic control circuit is connected to a suitable source of pneumatic pressure through a pressure line 290 and air filter 292. In the illustrated embodiment, the control circuit includes three branch pressure lines 294, 296 and 298 each of which is connected to the pressure line 290 downstream of the air filter 292 through an associated oiler 294a, 296a, 298a and an associated pressure regulator 294b, 296b and 298b, respectively. The pressure regulators are preferably set to provide 40 psi minimum. As will become apparent hereinbelow, employing individual branch lines for the three functions of clamping, blade actuation and stripping enables the operator to vary the operating pressure for each function. Thus, the operator can decrease the clamping pressure so as not to deform a conductor being stripped, or can vary the rate of travel of the blades, or can vary the stripping cylinder pressure to vary the rate at which a slug is removed from its underlying conductor. The various functions could be operated from a common circuit with a single oiler and pressure regulator if such variable control is not desired.

The pressure branch line 294 includes a control valve 300, termed the clamp valve, which is normally biased to a condition providing pressure to the rod end of the clamp cylinder 100 and connecting the piston end of the clamp cylinder to atmosphere through an exhaust port flow control valve 302.

The pressure branch line 296 is connected through a manually controlled set-up valve 304, which is optional in the pneumatic control circuit, and through a pressure actuated control valve 308 to the blade actuating cylinder 172 so that air pressure is normally applied to the rod end of the blade cylinder and the piston end of the blade cylinder is connected to atmosphere through an exhaust port flow control valve 310.

The pressure branch line 298 is connected through a manually operated set-up valve 314 to a fully pressure operated strip control valve 316 which, in turn, is connected in pressure relation to the rod and piston ends of the strip actuating cylinder 260, as through the aforementioned fittings 272a and 272b.

The pressure branch line 298 also includes a manually operated foot valve 320 which is located to enable the operator to readily initiate a strip operation by foot actuation of the foot valve. The foot valve 320 is connected through the strip stroke limit valve 284 to the clamp valve 300 and to the strip control valve 316, as schematically illustrated.

In operation, foot actuation of the foot valve 320 effects exhaust of pilot air from the strip control valve 316 which prepares the strip control valve for operation. With the foot valve 320 actuated, air pressure from branch line 298 flows through the strip length control valve 284 providing pilot air pressure to the clamp valve 300 to actuate the clamp valve. Such actuation of clamp valve 300 reverses the air pressure on the clamping cylinder 100 so as to apply air pressure to the piston end thereof and connect the rod end of the clamp valve to atmosphere through a muffler 322 which enables substantially unrestricted movement of the clamp piston rod 102 so as to provide maximum operating speed thereof. The pressure line to the piston end of the clamp actuating cylinder 100 is connected to the blade control valve 308 so as to provide pilot pressure thereto and effect actuation thereof. Such actuation of blade control valve 308 reverses the air pressure to the blade actuating cylinder 172 so as to apply air pressure to the piston end thereof and cause extension of the blade actuating piston rod 174 at a controlled rate by connecting the rod end of the blade actuating cylinder to atmosphere through a manually adjustable exhaust port flow control valve 324. In this manner, the stripping blades 32a,b and trim blades 34a,b will not close before the clamping jaws 20a and 20b are closed to clamp a conductor wire therebetween preparatory to stripping and trimming.

Simultaneously, air pressure applied to the piston end of the blade actuating cylinder 172 provides pilot air to the strip control valve 316 through a control valve 326, termed the "blades extend valve", which is normally biased to a position as schematically illustrated in FIG. 9 but which is connected to the rod end of the blade actuator cylinder 172 so as to receive pilot pressure therefrom. The pressure created on the rod end of the blade actuating cylinder 172 by controlled exhaust through exhaust valve 324 causes operation of the control valve 326 to block pilot air to the stripper control valve 316.

After the actuating piston rod 174 of the blade actuating cylinder 172 has extended fully to close the strip blades and, if used, the trim blades 32a,b and 34a,b so as to cut generally vertical slits in opposite sides of the insulation layer and effect complete severing through the conductor wire by trim blades 34a,b, pressure on the rod end of the blade actuating cylinder exhausts to atmospheric pressure removing the pilot air from the control valve 326 and enabling it to restore the condition illustrated schematically in FIG. 9. Pilot air from the piston end of the blade actuating cylinder 172 then passes through the control valve 326 to provide pilot air to the strip control valve 316 and effect actuation thereof to reverse the air pressure on the strip actuating cylinder 260 so as to apply pressure to the rod end thereof. The strip actuating cylinder 260 then retracts relative to its actuating piston rod 266 which, as aforedescribed, is fixed to the rear end wall 42 of the base 16. Such retraction of the strip actuating cylinder pulls the carriage means 24 and associated stripper means 30 to the rear of the base 16 causing the closed stripper blades 32a,b to fully sever the insulation slug from the remainder of the insulation layer and move it longitudinally along the clamped conductor wire. When the carriage means 24 has reached its maximum travel, dependent upon the selected adjustment of stop plate 274, the strip length control valve 284 is actuated by the actuating screw 286 to block pilot air from the foot valve 320 and exhaust pilot air from the clamp valve 300 to atmosphere enabling the clamp valve 300 to restore.

Restoration of the clamp valve 300 reverses the air pressure supply to the clamp actuating cylinder 100 so as to effect retraction thereof. With pressure on the piston end of the clamp actuating cylinder 100 being exhausted to atmosphere, pilot air is removed from the blade control valve 308 to effect restoring thereof and reverse the air pressure supply to the blade actuator cylinder 172 to cause retraction of the blade actuator piston rod 174 and associated blades 32b and 34b.

Pressure on the rod end of the blade actuating cylinder 172 again provides pilot air to the control valve 326 which effects operation thereof to exhaust pilot air from the strip control valve 316 preparing for restoration of the strip control valve.

As long as the foot valve 320 remains operated by the operator, the stripper apparatus 10 will remain in a condition wherein the clamping jaws 20a,b and blades 32a,b and 34a,b are in relative open positions and the carriage means 34 is in a rearward position as shown in FIG. 6. Release of the foot valve by the operator so as to restore the foot valve to the condition illustrated schematically in FIG. 9 connects the strip length control valve 284 to atmosphere (at this point blocked by its actuation by actuator 286) and applies pilot air to the strip control valve 316 to restore it to the condition illustrated in FIG. 9. Restoration of the strip control valve 316 reverses the air pressure supply to the strip actuating cylinder 260 so as to cause the actuator body to move relative to its fixed piston 266, thereby pushing the carriage means 24 and associated stripper means 30 to a forward position wherein the blade holder support blocks 146 and 154 engage the rearwardly facing surface 148 of the front end wall 40 to complete a stripping cycle and prepare the stripping apparatus for the next stripping operation.

The various control valves and connecting pressure lines of the control circuit illustrated in FIG. 9 may be mounted on various components of the apparatus 10 so as to provide a fully integrated and compact unit, except for the foot valve which is mounted for access by the operator's foot.

To enable set-up and/or adjustment of the gap between the clamping jaws 20a,b and stripping blades 32a,b when in relative closed positions, the set-up valve 314, which is mounted so as to be accessible through an opening in the guard cover 48, is manually actuated to remove air from the piston end of the strip actuating cylinder 260. Thereafter, depressing the foot valve 320 initiates operation of the various elements as aforedescribed except that the strip cylinder 260 will not operate. This prevents the strip stroke control valve 284 from operating and opening the clamping jaws 20a,b and stripping blades 32a,b and thus enables the operator to selectively adjust their closed position gaps. In this manner, the clamping jaw and blade actuating cylinders 100 and 172, respectively, are controlled directly by the foot valve 320, and adjustment of the clamping jaw and stripping blade gaps is greatly simplified.

An alternative manner of set-up or adjustment of the trim blades is to employ the optional set-up valve 304 which is connected in circuit with the blade control valve 308. Manual operation of the optional set-up valve 304 causes air to be removed from the rod end of the blade actuating cylinder 172 which permits hand operation or movement of the blade holder 140b when setting up the trim blades 34a,b.

In accordance with one feature of the invention, as the strip actuating cylinder 260 initially begins movement toward the stop plate 274, the compression springs 264a,b maintain the carriage means 24 and associated stripper means 30 in their forward positions against the front end wall 40 of base 16. This initial movement of mounting plate 238 relative to the carriage back plate 138 effects rearward pre-travel of the stop members 230 and 250 of the stop means 28 prior to movement of the blades 32a,b and 34a,b. Such pre-travel of stop means 28 relative to stripper means 30 causes any slug trimmed from the conductor wire 12 which may have become lodged between the stripper blade 34a and either of the stop surfaces 230a or 250a to drop downwardly and thus prevent clogging or other interference with operation of the stripper apparatus.

In situations where a length of jacket layer is stripped from a plurality of underlying "singles" of insulated conductor wire, the insulation layers on the single conductor wires may be stretched somewhat relative to their respective conductor elements when the overlying jacket is stripped therefrom. In such cases, the insulation layers may extend forwardly from the ends of the associated internal conductor elements so that when the end of a single insulated conductor wire is placed against a stop surface and a length of the insulation layer is stripped from the underlying conductor element, the exposed length of conductor element will not be equal to the length of the insulation jacket stripped therefrom. This leads to non-uniform exposed lengths of conductor elements for different conductor wires of the same conductor cable, or as between the individual conductor wires of different conductor cables. In accordance with the illustrated embodiment of the present invention, the stop members 230 and 250 are adjusted relative to the trim blades 34a,b so that during a stripping operation, the trim blades 34a,b sever both the insulation layer and underlying conductor element of a conductor wire referenced against the stop means, thus leaving a known predetermined length of exposed conductor as defined by the distance between the cutting edges of the stripping blades 32a,b and trim blades 34a,b.

While a preferred embodiment of the present invention has been illustrated and described, it will be understood that changes and modifications may be made therein without departing from the invention in its broader aspects. Various features of the invention are defined in the following claims.

What is claimed is:

1. Apparatus for stripping a coaxial outer layer of insulation or jacket material from an electrical conductor wire or cable comprising, in combination:

a base defining a longitudinal axis, clamping means including a pair of clamping jaws supported by said base and operable between relative open positions enabling positioning of a conductor wire therebetween and closed positions clamping said conductor wire therebetween, carriage means supported by said base for movement along a predetermined path of travel, stripper means carried by said carriage means and including a pair of mutually cooperable stripping blades, blade holder means supporting said stripper blades for movement between relative open positions adapted to receive said conductor wire therebetween and closed positions adapted to sever the coaxial layer a predetermined radial depth, actuator means supported by said base and cooperative with said carriage means to effect selective movement of said stripping blades when in their said closed positions to sever the insulation layer of the conductor wire disposed therebetween and move said severed insulation layer longitudinally of said conductor wire, and stop means carried by said actuator means and defining a reference surface against which an end of the conductor wire may be placed preparatory to trimming and stripping thereof, said actuator means including means adapted to effect pre-travel of said stop means prior to movement of said carriage means in a direction to move said severed insulation layer so as to effect release of any severed insulation slugs lodged between said stripper blades and said stop means.

2. Apparatus as defined in claim 1 wherein said means adapted to effect said pre-travel of said stop means includes coil spring means interposed between said actuator means and said carriage means and adapted to bias said actuator means and carriage means in predetermined spaced apart relation, and means limiting the extent of spaced apart relation to which said actuator means and carriage means may be biased.

3. Apparatus as defined in claim 1 wherein said blade holder means includes a pair of substantially identical blade holders each of which has a stripper blade and a trim blade mounted thereon, a first blade holder support block mounted on said carriage means and supporting one of said blade holders in substantially fixed relation on said carriage means such that the associated stripping and trim blades are disposed transverse to the longitudinal axis of said base, said blade holder means including a second blade holder support block supporting the other of said blade holders so that said stripping and trim blades are supported in laterally opposed relation, said second blade holder support block being supported for movement transverse to said base to effect said open and closed positions of said stripping and trim blades, said blade holders being releasibly mounted and interchangeable to enable interchanging with similar blade holders.

4. Apparatus as defined in claim 3 wherein each of said blade holders has a transverse opening formed therethrough defining a reference surface disposed substantially transverse to the longitudinal axis of said base, a retaining screw mounted longitudinally of each blade holder and having an end disposed within the associated transverse opening, said stripping and trim blades being secured within said transverse openings in said blade holders by said retaining screws so as to define laterally opposed pairs of stripping and trim blades.

5. Apparatus as defined in claim 1 including means cooperative with said stripping means and operative to prevent movement of a conductor wire to a position disposed below the effective cutting edges of said stripping blades when inserted therebetween.

6. Apparatus as defined in claim 1 wherein said stripper means further includes a pair of mutually cooperable trim blades supported by said blade holder means in predetermined spaced relation from said stripping blades for movement with said blade holder means, said trim blades being adapted to completely sever said conductor wire substantially simultaneously with movement of said stripping blades to their said closed positions, and including knock-out means cooperative with said stripping and trim blades and operative to effect release of any severed insulation layer slug lodged between said stripping and trim blades after a stripping operation.

7. Apparatus as defined in claim 1 wherein said actuator means includes an actuating cylinder operative to effect predetermined movement of said carriage means along said path of travel, and stop plate means cooperable with actuating cylinder and selectively adjustable to vary the extent of travel of said carriage means and associated stripper means so as to vary the distance a severed insulation layer slug is moved longitudinally along its associated conductor wire during a stripping operation.

8. Apparatus as defined in claim 1 wherein one of said clamping jaws is supported in relatively fixed position on said base, the other of said clamping jaws being movable relative to said one of said clamping jaws, and including cam means operatively associated with said base and said one of said clamping jaws and enabling precise selective adjustment of said one of said clamping jaws relative to said base while providing a positive stop for abutment therewith.

9. Apparatus as defined in claim 1 wherein said clamping means includes a clamping actuator cylinder having an actuating piston operatively associated with one of said clamping jaws and operative to effect movement thereof relative to the other of said clamping jaws so as to effect said relative open and closed positions of said clamping jaws, a first adjustable stop member substantially axially aligned with the axis of said clamp actuating cylinder and adapted to provide a positive stop to limit the extent of movement of said movable clamping jaw relative to the other of said clamping jaws, said stripper means including a blade actuating cylinder having an actuating piston cooperative with a first blade holder supporting selected ones of said stripping and trim blades, and a second adjustable stop member axially aligned with the axis of said blade actuating cylinder and adapted for cooperation therewith to provide a positive stop limiting the extent of relative closing between said stripping and trim blades.

10. Apparatus as defined in claim 9 wherein said first and second stop members are accessible from externally of said apparatus and are adapted for manual adjustment to vary the positions thereof.

11. Apparatus as defined in claim 1 wherein said stop means includes a first stop member supported by said actuator means in juxtaposed relation to said stripper means, said first stop member defining a first reference surface adjustable relative to said stripping blades and enabling placement of an end of a conductor wire thereagainst to effect stripping of a predetermined length of said conductor wire, said stop means including a second stop member defining a second reference surface selectively adjustable relative to said first reference surface and enabling placement of the end of a second conductor wire thereagainst to facilitate stripping of a different predetermined length of said second conductor wire during a stripping operation.

12. Apparatus as defined in claim 11 wherein said first stop member is supported on a support rod and is releasibly fixed thereon by a set screw, and including a bearing member interposed between said set screw and said support rod so that said set screw tightens against said bearing member and does not mar said support rod.

13. Apparatus as defined in claim 1 wherein one of said clamping jaws is adjustably mounted on said base and the other is mounted on a clamp holder supported on a pair of parallel guide rods for movement relative to said base, and including ball bushing means interposed between said clamp holder and said guide rods and providing low friction precision sliding relation thereon.

14. Apparatus as defined in claim 13 including a pair of bearing rods extending longitudinally of said base, said carriage means including a carriage base mounted on said longitudinal bearing rods for movement therealong, and including ball bushing means interposed between said carriage base and said longitudinal bearing rods and providing precision low friction relation therebetween during movement of said carriage block.

15. Apparatus as defined in claim 14 wherein said carriage means includes a pair of parallel guide rods disposed transverse to the direction of movement of said carriage means, a blade holder support block mounted on said transverse guide rods for movement therealong and supporting a blade holder on which is mounted selected ones of said stripping and trim blades, and including ball bushing means interposed between said blade holder support block and said transverse guide rods and providing low friction precision sliding relation therebetween.

16. Apparatus as defined in claim 3 wherein said blade holders have identical tongue and groove relation with their associated blade holder support blocks.

17. Apparatus as defined in claims 1 including pneumatic control means operative to effect semiautomatic operation of said apparatus in predetermined sequence, said control means being operative to move said stripping and trim blades to their said relatively closed positions after said clamping jaws have been moved to their said relatively closed positions.

18. Apparatus as defined in claim 1 including tool holder means formed integral with said base.

19. Apparatus as defined in claim 1 including a control circuit including a first fluid pressure operated actuator for effecting said relative movement of said clamping jaws, a second fluid pressure operated actuator operatively associated with said stripper means and operative to effect movement of said stripper blades between their said open and closed positions, a third fluid pressure operated actuator operative to effect said selective movement of said carriage means, said control circuit including a separate fluid pressure branch for each of said first, second and third actuators, and pressure control means in each of said separate branches enabling selective varying of the fluid pressure applied to the corresponding actuator.

20. Apparatus for stripping a coaxial outer layer of insulation or jacket material from an electrical conductor wire or cable, comprising, in combination:

a base defining a longitudinal axis, a first pair of parallel bearing rods supported by said base in transverse relation thereto, clamping means including a clamp holder block slidably mounted on said first pair of bearing rods through ball bushings, a pair of clamping jaws one of which is mounted on said base and the other of which is mounted on said clamp holder block for movement between open and closed positions relative to said one of said clamping jaws, a second pair of bearing rods supported by said base in substantially coplanar relation parallel to the longitudinal axis of said base, carriage means slidably supported on said second pair of bearing rods through ball bushings for movement along said second bearing rods, stripper means carried by said carriage means and including a third pair of parallel bearing rods disposed transverse to the longitudinal axis of said base, a first blade holder block supported on said third pair of bearing rods through ball bushings for sliding movement therealong, a second blade holder block fixedly supported on said carriage means in lateral relation to said first blade holder block, a first set of stripping and trim blades mounted on said first blade holder block for movement therewith, a second set of stripping and trim blades mounted on said second blade holder block so as to lie in laterally opposed relation with said first set of stripping and trim blades, said first and second sets of stripping and trim blades being movable between relative open positions adapted to receive a conductor wire therebetween and closed positions wherein said stripping blades slit the coaxial outer layer a predetermined radial depth and said trim blades effect complete severing of the conductor wire, actuator means supported by said base and cooperative with said carriage means to effect selective movement of said stripping blades when in their said closed positions as as to sever the coaxial outer layer and move the severed layer longitudinally of said conductor wire, and stop means carried by said actuator means and defining a reference surface spaced a predetermined distance from said trim blades and against which an end of the conductor wire may be placed preparatory to trimming and stripping thereof, said actuator means including means interposed between said actuator means and said carriage means and adapted to effect pre-travel of said stop means prior to movement of said carriage means in a direction to remove the severed coaxial outer layer so as to effect release of any severed slugs lodged between said trim blades and said stop means.

* * * * *